(12) United States Patent
Fenn et al.

(10) Patent No.: US 8,076,001 B2
(45) Date of Patent: Dec. 13, 2011

(54) CROSSLINKED COATINGS COMPRISING LACTIDE

(75) Inventors: David R. Fenn, Allison Park, PA (US); Jackie L. Kulfan, Valencia, PA (US)

(73) Assignee: PPG Industries Ohio, Inc, Cleveland, OH (US)

( * ) Notice: Subject to any disclaimer, the term of this patent is extended or adjusted under 35 U.S.C. 154(b) by 615 days.

(21) Appl. No.: 12/202,755

(22) Filed: Sep. 2, 2008

(65) Prior Publication Data

US 2010/0055473 A1 Mar. 4, 2010

(51) Int. Cl.
*B32B 27/40* (2006.01)

(52) U.S. Cl. ............... 428/423.1; 428/423.5; 428/425.9

(58) Field of Classification Search .............. 428/423.5, 428/425.9, 423.1; 524/539, 590, 597, 599
See application file for complete search history.

(56) References Cited

U.S. PATENT DOCUMENTS

| | | |
|---|---|---|
| 4,296,947 A | 10/1981 | Spatz |
| 4,977,207 A | 12/1990 | Hoefer |
| 5,225,521 A | 7/1993 | Spinu |
| 5,270,400 A | 12/1993 | Spinu |
| 5,359,026 A | 10/1994 | Gruber |
| 5,399,666 A | 3/1995 | Ford |
| 5,489,474 A * | 2/1996 | Shinoda et al. .............. 428/343 |
| 5,563,206 A | 10/1996 | Eicken |
| 5,714,573 A | 2/1998 | Randall |
| 5,849,401 A | 12/1998 | El-Afandi |
| 6,107,433 A | 8/2000 | Petrovic |
| 6,538,059 B1 | 3/2003 | Muller |
| 6,686,435 B1 | 2/2004 | Petrovic |
| 6,916,547 B2 | 7/2005 | Tian |
| 7,256,250 B2 | 8/2007 | Tuominen |
| 2008/0004369 A1 | 1/2008 | Seppala |
| 2008/0176061 A1* | 7/2008 | Ambrose |
| 2009/0239964 A1* | 9/2009 | Sasaki et al. .............. 521/117 |

FOREIGN PATENT DOCUMENTS

| | | | |
|---|---|---|---|
| DE | 1520648 | * | 7/1969 |
| EP | 0293905 | * | 12/1988 |
| EP | 0640632 A1 | * | 3/1995 |
| EP | 0778304 B1 | | 6/1997 |
| EP | 1849810 A1 | * | 10/2007 |
| EP | 2065421 | * | 6/2009 |
| GB | 2164949 A | * | 4/1986 |
| JP | 62020522 | | 1/1987 |
| JP | 08100057 | | 4/1996 |
| JP | 2001151871 A | * | 6/2001 |
| JP | 20022348366 | * | 12/2002 |
| JP | 2007-025656 | | 2/2007 |
| WO | 92/00336 | | 1/1992 |
| WO | 97/27253 | | 7/1997 |
| WO | 9950345 | | 10/1999 |
| WO | 03/033563 A1 | | 4/2003 |
| WO | 2004/096882 | | 11/2004 |
| WO | 2006/007591 A1 | | 1/2006 |
| WO | 2007/019051 A1 | | 2/2007 |
| WO | 2008029527 | | 3/2008 |
| WO | 2009/105625 A | | 8/2009 |

OTHER PUBLICATIONS

Peshane, Sunil N. et al., "Oil-modified PUDs: cross-linkable, VOC compliant, cost effective", European Coatings Journal, 2003, pp. 105-110, 88 (3), Vincentz Network, Hannover, Germany.
Shukla, Jignesh M. et al., "Epoxy PUR goes bio", European Coatings Journal, 2006, pp. 38-45, 38 (11), Vincentz Network, Hannover, Germany.
"Modern Polyurethane dispersions for wood and plastic varnishes", European Coatings, May 2007; pp. 102-103, Vincentz Network, Hannover, Germany.
U.S. Appl. No. 12/202,820, filed Sep. 2, 2008, entitled: Radiation Curable Coating Compositions Comprising a Lactide Reaction Product.
U.S. Appl. No. 12/202,859, filed Sep. 2, 2008, entitled: Waterborne Polyurethane Dispersion Comprising Biomass Derived Polyol and Coatings Comprising Same.
U.S. Appl. No. 12/202,801, filed Sep. 2, 2008, entitled: Coating Compositions Comprising the Reaction Product of a Biomass Derived Polyol and a Lactide.
U.S. Appl. No. 12/202,844, filed Sep. 2, 2008, entitled: Biomass Derived Radiation Curable Liquid Coatings.
U.S. Appl. No. 12/266,588, filed Nov. 7, 2008, entitled: Radiaton Curable Coating Compositions Comprising a Lactide Reaction Product.
U.S. Appl. No. 12/394,785, filed Feb. 27, 2009, entitled: Biomass Derived Radiation Curable Liquid Coatings.
Dimmers, Markus, "Sustaining resources", Polymers Paint Colour Journal, Aug. 2007; pp. 22-24, dmg world media (uk) ltd, Redhill, Surrey, United Kingdom.
"Use of Soybean oil in coatings", Polymers Paint Colour Journal, Mar. 6, 1991; pp. 119-126, vol. 181, No. 4278, dmg world media (uk) ltd, Redhill, Surrey, United Kingdom.

\* cited by examiner

*Primary Examiner* — Thao T. Tran
(74) *Attorney, Agent, or Firm* — Diane R. Meyers; Julie W. Meder

(57) ABSTRACT

Crosslinked coatings comprising a reaction product of a compound containing two or more active hydrogen groups and a lactide are disclosed, as are substrates coated therewith.

27 Claims, No Drawings

US 8,076,001 B2

CROSSLINKED COATINGS COMPRISING LACTIDE

FIELD OF THE INVENTION

The present invention relates generally to crosslinked coatings comprising a) the reaction product of a compound containing two or more active hydrogen containing groups and a lactide and b) a crosslinker.

BACKGROUND OF THE INVENTION

An increase in demand for environmentally friendly products has made "green" coating compositions, particularly biodegradable coatings, of interest in numerous industries. This is particularly relevant in the consumer electronics industry, where an increasing number of cellular telephones, PDAs, MP3s, and the like are finding their way to landfills. Biodegradable coatings, particularly with biodegradable plastics used in the housings of those devices, are desirable.

SUMMARY OF THE INVENTION

The present invention is directed to a crosslinked coating comprising a) the reaction product of a compound containing two or more active hydrogen groups and a lactide; and b) a crosslinker. The present invention is further directed to a coating comprising the reaction product of a compound containing two or more active hydrogen groups and a lactide, wherein the ratio by weight of active hydrogen containing compound to lactide is 1:>10 to 1:10,000.

DETAILED DESCRIPTION OF THE INVENTION

The present invention is directed to a crosslinked coating comprising the reaction product of a compound containing two or more active hydrogen groups and a lactide; this is sometimes referred to herein as the "lactide reaction product", "reaction product" and like terms. A "crosslinked" coating is one in which at least some functional groups of one component react with at least some functional groups of another component when subjected to conditions that allow for and/or facilitate such reaction or "cure" (such as mixing, heating, and the like). As used herein, a "crosslinked" coating includes a "crosslinkable" coating; that is, a coating that will be crosslinked when subjected to the appropriate conditions.

It will be appreciated that the coatings described herein can be either one component ("1K"), or multi-component compositions, such as two component ("2K") compositions. A 1K composition will be understood as referring to a composition wherein all the coating components are maintained in the same container after manufacture, during storage, etc. A 1K coating can be applied to a substrate and cured by any conventional means, such as by heating, forced air, and the like. The present coatings can also be 2K coatings or multi-component coatings, which will be understood as coatings in which various components are maintained separately until just prior to application.

As noted above, the coatings of the present invention comprise the reaction product of a compound containing two or more active hydrogen groups and a lactide. Compounds containing two or more active hydrogen groups, sometimes referred to herein as an "active hydrogen containing compound" and like terms, include compounds containing two or more thiol, primary amine, secondary amine and/or hydroxyl groups. It will be appreciated by those skilled in the art that compounds containing two or more active hydrogen groups will react with the lactide to form a compound containing poly(lactic acid) units.

In certain embodiments, the compound containing two or more active hydrogen groups is a polyol. Any polyol can be used according to the present invention. Suitable polyols can include, but are not limited to, small molecules containing more than one hydroxyl group, for example neopentyl glycol, glycerol, isosorbide, pentaerythritol and/or propanediol, or polymeric polyols such as a polyester polyol or an acrylic polyol. Suitable polyols are widely commercially available. Particularly suitable polyols have a number average molecular weight as determined by GPC of 500 to 100,000, such as 500 to 10,000. In certain embodiments, the polyol can have a hydroxyl value of 20 to 400, such as 40 to 300 or 120 to 350. In other embodiments the hydroxyl value can range from 1200 to 2100, such as 1400 to 1900.

In certain embodiments, at least some of the polyol is biomass derived. These polyols can be derived from natural oils such as castor oil, peanut oil, soy bean oil or canola oil. The hydroxyl groups present in the biomass derived polyols can be naturally occurring or they can be introduced, for example, by modification of carbon-carbon double bonds present in the oils. Natural oil derived polyols are described in United States Patent Application Publication Number 2006/0041156 A1, U.S. Pat. No. 7,084,230, WO 2004/096882 A1, U.S. Pat. No. 6,686,435, U.S. Pat. No. 6,107,433, U.S. Pat. No. 6,573,354 and U.S. Pat. No. 6,433,121, all of which are incorporated in their entirety herein. Methods of modifying carbon-carbon double bonds to introduce hydroxyl groups include treatment with ozone, air oxidation, reaction with peroxides or hydroformylation (as described in "Polyols and Polyurethanes from Hydroformylation of Soybean Oil", Journal of Polymers and the Environment, Volume 10, Numbers 1-2, pages 49-52, April, 2002, incorporated herein in its entirety). A particularly suitable biomass derived polyol is a soy polyol. Soy polyols are commercially available from Cargill Inc., Urethane Soy Systems Co. and BioBased Technologies. In certain other embodiments, the polyol is derived from a recycled polymer, such as a polyester.

Any suitable lactide can be used according to the present invention, such as L-lactide, meso-lactide or D-lactide. Mixtures of any of the isomers can also be used. Lactide is the cyclic diester of lactic acid (2-hydroxypropionic acid). Suitable lactides are also commercially available.

As noted above, in certain embodiments at least some of the active hydrogen containing compound is biomass derived; in certain other embodiments at least some of the lactide is biomass derived, and in yet certain other embodiments at least some of each are biomass derived. A biomass derived compound will be understood to be a compound derived from a living or recently living organism, for example, plants (including trees) or animals and not from a petroleum based source. In certain embodiments, the reaction product of an active hydrogen containing compound and a lactide comprises 40 weight % or greater biomass derived material, such as 60 weight % or greater, 80 weight % or greater, or 90 weight % or greater, based on total solid weight. It will be appreciated that the lactide reaction product can also contain any amount of non-biomass derived material, such as petroleum derived material.

The reaction between the lactide and the active hydrogen containing compound can be carried out under any suitable conditions. For example, the active hydrogen containing compound and lactide can be mixed and heated to a temperature of 100-200° C., such as 120-150° C., for a period of two to ten hours. The reaction can be carried out in the presence of a catalyst, for example complexes of tin, aluminum, zinc and lanthanides. Tin compounds such as tin(II) 2-ethylhexanoate are particularly suitable. The reaction can be carried out in bulk or in the presence of solvent(s).

The molar ratio of active hydrogen containing groups to lactide can be 1:0.1 to 1:10, such as 1:0.2 to 1:6, or 1:0.5 to 1:3. In certain other embodiments, the weight ratio of active hydrogen containing compound to lactide is 10:1 to 1:10, such as 5:1 to 1:6 or 2:1 to 1:4.

In certain embodiments, the active hydrogen containing compound can be reacted with lactide and one or more other cyclic monomers, such as caprolactone. These reactions can be carried out simultaneously, or in sequence.

The reaction product of a compound containing two or more active hydrogen groups and a lactide can have a hydroxyl value of 20 to 400, such as 40 to 350, or 80 to 220. The reaction product of a compound containing two or more active hydrogen groups and a lactide can have a number average molecular weight, as determined by GPC ("Mn"), of 500 to 100,000, such as 750 to 10,000, or 1000 to 7500.

It has been surprisingly discovered that certain embodiments of the present coatings are biodegradable. A biodegradable composition will be understood as one in which the organic substances that comprise the composition are broken down by living organisms, such as in the presence of oxygen (aerobically) or without oxygen (anaerobically). Certain compositions of the current invention can be biodegradable under aerobic conditions, such as industrial or domestic composting. Generally, the rate of biodegradation of a composition under specific conditions increases as the content of poly(lactic acid) units increases. In certain embodiments, the coatings of the present invention comprise at least 20% poly (lactic acid) units by weight, such as at least 32 weight %, or at least 38 weight %, with weight % based on total solid weight of the coating.

The coating compositions of the current invention also comprise a crosslinker that is reactive with the lactide reaction product. Examples include polyisocyanates and aminoplasts.

Suitable polyisocyanates include multifunctional isocyanates. Examples of multifunctional polyisocyanates include aliphatic diisocyanates like hexamethylene diisocyanate and isophorone diisocyanate, and aromatic diisocyanates like toluene diisocyanate and 4,4'-diphenylmethane diisocyanate. The polyisocyanates can be blocked or unblocked. Examples of other suitable polyisocyanates include isocyanurate trimers, allophanates, and uretdiones of diisocyanates and polycarbodiimides such as those disclosed in U.S. patent application Ser. No. 12/056,306 filed Mar. 27, 2008, incorporated by reference in its entirety herein. Suitable polyisocyanates are well known in the art and are widely available commercially. For example, suitable polyisocyanates are disclosed in U.S. Pat. No. 6,316,119 at columns 6, lines 19-36, incorporated by reference herein. Examples of commercially available polyisocyanates include DESMODUR N3390, which is sold by Bayer Corporation, and TOLONATE HDT90, which is sold by Rhodia Inc.

Suitable aminoplasts include condensates of amines and or amides with aldehyde. For example, the condensate of melamine with formaldehyde is a suitable aminoplast. Suitable aminoplasts are well known in the art. A suitable aminoplast is disclosed, for example, in U.S. Pat. No. 6,316,119 at column 5, lines 45-55, incorporated by reference herein.

The coatings of the present invention are not radiation curable.

In certain embodiments, the coatings of the present invention can comprise $\geq 20$ weight %, such as $\geq 40$ weight %, or $\geq 60$ weight %, based on total solids weight, of the lactide reaction product. The coatings of the present invention can comprise $\leq 95$ weight %, such as $\leq 90$ weight %, $\leq 85$ weight %, $\leq 80$ weight % or $\leq 70$ weight % based on total solids weight, of the lactide reaction product. Any range within combinations of these numbers can be used according the present invention. In certain embodiments, 10% or greater, such as 20% or greater, or 50% or greater, of the carbon content of the coating composition originates directly from biomass.

It will be appreciated that the lactide reaction product used in the coatings according to the present invention can form all or part of the film-forming resin of the coating. In certain embodiments, one or more additional film-forming resins are also used in the coating. For example, the coating compositions can comprise any of a variety of thermoplastic and/or thermosetting compositions known in the art. The coating compositions may be water based or solvent based liquid compositions, or alternatively, may be in solid particulate form, i.e. a powder coating.

Thermosetting or curable coating compositions typically comprise film-forming polymers or resins having functional groups that are reactive with either themselves or a crosslinking agent. The additional film-forming resin can be selected from, for example, acrylic polymers, polyester polymers, polyurethane polymers, polyamide polymers, polyether polymers, polysiloxane polymers, copolymers thereof, and mixtures thereof. Generally these polymers can be any polymers of these types made by any method known to those skilled in the art. Such polymers may be solvent borne or water dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups) mercaptan groups, and combinations thereof.

Appropriate mixtures of film-forming resins may also be used in the preparation of the present coating compositions.

Thermosetting coating compositions typically comprise a crosslinking agent that may be selected from, for example, any of the aminoplasts or polyisocyanates listed above, polyepoxides, beta hydroxyalkylamides, polyacids, anhydrides, organometallic acid-functional materials, polyamines, polyamides, and mixtures of any of the foregoing. In certain embodiments, the present coatings comprise a thermosetting film-forming polymer or resin and a crosslinking agent therefor and the crosslinker is either the same as or different from the crosslinker that is used to crosslink the lactide reaction product. In certain other embodiments, a thermosetting film-forming polymer or resin having functional groups that are reactive with themselves are used; in this manner, such thermosetting coatings are self-crosslinking.

The present invention is further directed to a coating comprising a lactide reaction product having an active hydrogen containing compound to lactide ratio by weight of 1:>10 to 1:10 000, such as 1:>10 to 1:5000 or 1:50 to 1:4000. This lactide reaction product, sometimes referred to herein as the "excess lactide reaction product" and like terms, can be used alone or in conjunction with one or more additional film-forming resins such as those described above. The excess lactide reaction product can be used in an amount of 0.5 to 75, such as 1 to 60 or 2 to 40 weight % of the coating, or any combinations thereof, with weight % based on the total solids weight of the coating. It has been surprisingly discovered that the use of an excess lactide reaction product in a coating can result in improved adhesion, as compared to a coating lacking such a reaction product. Thus, the excess lactide reaction product can be used as in additive quantities in conventional coatings, or can comprise a relatively large amount of the coating and improved adhesion may be observed. The coating comprising the excess lactide reaction product may further comprise a crosslinking agent or may be without crosslinker. The active hydrogen compound and/or lactide used to form the excess lactide reaction product may or may not be biomass derived or can comprise a combination of biomass derived and non-biomass derived compounds. Any of the active hydrogen containing compounds and lactides described above can be used here.

The coating compositions of the present invention may also include a solvent and/or reactive diluent in one or more of the components. The coating can also be 100% solids. Suitable solvents include water, organic solvent(s) and/or mixtures thereof. Suitable organic solvents include glycols, glycol ether alcohols, alcohols, ketones, and aromatics, such as xylene and toluene, acetates, mineral spirits, naphthas and/or mixtures thereof. "Acetates" include the glycol ether acetates. The solvents can be biomass derived. Examples of biomass derived solvents include esters of lactic acid and esters of soybean oil fatty acid. In certain embodiments, the solvent is a non-aqueous solvent. "Non-aqueous solvent" and like terms means that less than 50 percent of the solvent is water. For example, less than 10 percent, or even less than 5 percent, of the solvent can be water. It will be understood that mixtures of solvents, including or excluding water in an amount of less than 50 percent, can constitute a "non-aqueous solvent". In other embodiments, the coating is aqueous or water-based. This means that 50% or more of the solvent is water. These embodiments have less than 50%, such as less than 20%, less than 10%, less than 5% or less than 2% solvent.

If desired, the coating compositions can comprise other optional materials well known in the art of formulating coatings in any of the components, such as colorants, plasticizers, abrasion resistant particles, anti-oxidants, hindered amine light stabilizers, UV light absorbers and stabilizers, surfactants, flow control agents, antifoaming agents, wetting agents, thixotropic agents, fillers, waxes, lubricants, fortifiers, stabilizers, organic cosolvents, reactive diluents, catalysts, grind vehicles, and other customary auxiliaries.

An "abrasion resistant particle" is one that, when used in a coating, will impart some level of abrasion resistance to the coating as compared with the same coating lacking the particles. Suitable abrasion resistant particles include organic and/or inorganic particles. Examples of suitable organic particles include but are not limited to diamond particles, such as diamond dust particles, and particles formed from carbide materials; examples of carbide particles include but are not limited to titanium carbide, silicon carbide and boron carbide. Examples of suitable inorganic particles, include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles. For example, the particles can be microparticles, having an average particle size of 0.1 to 50, 0.1 to 20, 1 to 12, 1 to 10, or 3 to 6 microns, or any combination within any of these ranges. The particles can be nanoparticles, having an average particle size of less than 0.1 micron, such as 0.8 to 500, 10 to 100, or 100 to 500 nanometers, or any combination within these ranges.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemicals, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference in its entirety. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, which is incorporated herein by reference in its entirety, United States Patent Application Publication Number 2005-0287348 A1, filed Jun. 24, 2004, and United States Patent Application Publication Number 2006-0251897, filed Jan. 20, 2006, which are also incorporated herein by reference in their entirety.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference in its entirety. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference in its entirety.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The present coatings can be applied to any substrates known in the art, for example automotive substrates and industrial substrates. These substrates can be, for example, metallic or non-metallic, including polymeric, plastic, polycarbonate, polycarbonate/acrylobutadiene styrene ("PC/ABS"), polyamide, wood, veneer, wood composite, particle board, medium density fiberboard, cement, stone, and the like. In a particularly suitable embodiment of the present invention, the substrate itself is biodegradable. Biodegradable substrates include, for example paper, wood and biodegradable plastics such as cellulose, poly(lactic acid), poly(3-hydroxybutyrate) and starch based plastics. In addition, the substrate can be one that has been recycled. The substrate can also be one that has already been treated in some manner to impart color and/or other visual effect. For example, a wood substrate that has been stained may then be coated according to the present invention, as can a substrate that has already had one or more other coating layers applied to it.

As used herein, the term "polyamide" in reference to a substrate means a substrate constructed from a polymer that includes repeating units of the formula:

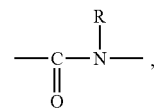

wherein R is hydrogen or an alkyl group. The polyamide may be any of a large class of polyamides based on aliphatic, cycloaliphatic, or aromatic groups in the chain. They may be formally represented by the products of condensation of a dibasic amine with a diacid and/or diacid chloride, by the product of self-condensation of an amino acid, such as omega-aminoundecanoic acid, or by the product of a ring-opening reaction of a cyclic lactam, such as caprolactam, lauryllactam, or pyrrolidone. They may contain one or more alkylene, arylene, or aralkylene repeating units. The polyamide may be crystalline or amorphous. In certain embodiments, the polyamide substrate comprises a crystalline polyamide of alkylene repeating units having from 4 to 12 carbon atoms, such as poly(caprolactam), (nylon 6), poly(lauryllactam), (nylon 12), poly(omega-aminoundecanoic acid), (nylon 11), poly(hexamethylene adipamide), (nylon 6.6), poly(hexamethylene sebacamide), (nylon 6.10), and/or an alkylene/arylene copolyamide, such as that made from meta-xylylene diamine and adipic acid (nylon MXD6). The term "nylon" includes all of these products as well as any other compound referred to in the art as nylon. Amorphous polyamides, such as those derived from isophoronediamine or trimethylcyclohexanediamine, may also be utilized. Blends of polyamides may also be utilized.

As used herein, the term "polyamide", when used in reference to a substrate, includes a reinforced polyamide substrate; a reinforced polyamide substrate is a polyamide substrate constructed from a polyamide that has been reinforced through the inclusion of, for example, fibrous materials, such as glass fiber or carbon fiber, or inorganic fillers, such as calcium carbonate, to produce a polyamide having increased rigidity, strength, and/or heat resistance relative to a similar polyamide that does not include such reinforcing materials. Reinforced polyamides, which are suitable for use as a substrate material in accordance with certain embodiments of the present invention, are commercially available and include, for example, those materials commercially available from Solvay Advanced Polymers under the IXEF name and, include, for example, the IXEF 1000, 1500, 1600, 2000, 2500, 3000 and 5000 series products; from EMS-Chemie Inc., Sumter, S.C., under the GRILAMID, GRIVORY, GRILON and GRILFLEX tradenames; and DuPont Engineered Polymers, such as those sold under the THERMX and MINLON tradenames.

The coatings of the present invention can be applied by any means standard in the art, such as electrocoating, spraying, electrostatic spraying, dipping, rolling, brushing, and the like.

The coatings can be applied to any dry film thickness, such as 0.1 to 4 mils, 0.3 to 2 mils or 0.7 to 1.3 mils. The coatings of the present invention can be used alone, or in combination with one or more other coatings. For example, the coatings of the present invention can comprise a colorant or not and can be used as a primer, ecoat, basecoat, top coat, automotive repair coat, and the like. For substrates coated with multiple coatings, one or more of those coatings can be coatings as described herein. In certain embodiments, a basecoat containing the excess lactide reaction product may be used in conjunction with a clearcoat comprising the lactide reaction product; either or both the clearcoat or basecoat can further comprise a crosslinking agent.

As used herein, unless otherwise expressly specified, all numbers such as those expressing values, ranges, amounts or percentages may be read as if prefaced by the word "about", even if the term does not expressly appear. Also, any numerical range recited herein is intended to include all subranges subsumed therein. Singular encompasses plural and vice versa. For example, although reference is made herein, including the claims, to "a" compound containing two or more active hydrogen groups, "a" lactide, "a" crosslinker, "a" lactide reaction product, "an" excess lactide reaction product, and the like, one or more of each of these and any other component can be used. "Including" means "including, but not limited to". As used herein, the term "polymer" refers to oligomers and both homopolymers and copolymers, and the prefix "poly" refers to two or more.

EXAMPLES

The following examples are intended to illustrate the invention, and should not be construed as limiting the invention in any way.

Example 1

Soy Polyol/Lactide Adduct—1:2 OH:Lactide Ratio

|   | Component | Mass (/g) |
|---|-----------|-----------|
| 1 | BiOH 1560[1] | 102.49 |
| 2 | Toluene | 23.98 |
| 3 | DL-Lactide[2] | 122.17 |
| 4 | Stanous octoate | 0.34 |
| 5 | Toluene | 1.02 |

[1]Soy-based polyol, available from Cargill, Inc., hydroxyl value 232 mg KOH/g.
[2]Available from NatureWorks LLC.

Components 1, 2 and 3 were charged to a flask fitted with a stirrer, nitrogen inlet, thermocouple and toluene filled Dean and Stark condenser. The mixture was raised to reflux, held for 15 minutes and then cooled to 80° C. Components 4 and 5 were added and the temperature was increased to 125° C. and maintained for eight hours, solvent being drained from the Dean and Stark condenser if reflux occurred at a lower temperature. The reaction product had a solids content of 98.9% and a number average molecular weight of 2400.

Example 2

Lactide Modified Acrylic Polyol—1:1 OH:Lactide Ratio

|    | Component | Mass (/g) |
|----|-----------|-----------|
| 1  | Butyl acetate | 122.84 |
| 2  | Styrene | 50.48 |
| 3  | Methyl methacrylate | 16.83 |
| 4  | Butyl acrylate | 30.29 |
| 5  | Hydroxyethyl methacrylate | 70.68 |
| 6  | t-dodecyl mercaptan | 3.37 |
| 7  | VAZO 67[3] | 6.73 |
| 8  | Butyl acetate | 33.66 |
| 9  | LUPEROX 26M50 | 0.84 |
| 10 | Butyl acetate | 3.37 |
| 13 | Stanous octoate | 0.08 |
| 14 | DL-Lactide | 78.28 |
| 15 | Butyl acetate | 78.35 |

[3]2,2'-Azobis(2-methylbutanenitrile), available from E. I. Du Pont de Nemours and Company.

Component 1 was raised to reflux in a flask fitted with a stirrer, thermocouple, nitrogen inlet and condenser. The temperature was adjusted throughout the process to maintain reflux until noted otherwise. Components 2-8 were added at a uniform rate over 180 minutes. After a further 30 minutes, components 9 and 10 were added over 10 minutes. 30 minutes later, components 11 and 12 were added over 10 minutes. Reflux was maintained for 60 minutes and then the temperature was reduced to 90° C. Components 13 and 14 were added and the temperature was increased to 125° C. and maintained for 8 hours. Finally component 15 was added. The reaction product had a solids content of 53.6% and a number average molecular weight of 2900.

Example 3

Glycerol/Lactide Adduct—1:3 OH:Lactide Ratio

|   | Component | Mass (/g) |
|---|-----------|-----------|
| 1 | Glycerol | 14.88 |
| 2 | DL-Lactide | 209.54 |
| 3 | Methyl isobutyl ketone | 24.85 |
| 4 | Stanous octoate | 0.59 |
| 5 | Methyl isobutyl ketone | 0.15 |
| 6 | Methyl isobutyl ketone | 49.79 |

Components 1-3 were charged to a flask fitted with a stirrer, nitrogen inlet, thermocouple and toluene filled Dean and Stark condenser. The mixture was raised to reflux, held for 15 minutes and then cooled to 80° C. Components 4 and 5 were added and the temperature was increased to 125° C. and maintained for eight hours, solvent being drained from the Dean and Stark condenser if reflux occurred at a lower temperature. Component 6 was then added. The reaction product had a solids content of 76.3% and a number average molecular weight of 1350.

Example 4

Soy Polyol/Lactide Adduct—1:2 OH:Lactide Ratio

|   | Component | Mass (/g) |
|---|---|---|
| 1 | BiOH 1560 | 546.59 |
| 2 | Toluene | 127.87 |
| 3 | DL-Lactide | 651.58 |
| 4 | Stanous octoate | 1.83 |
| 5 | Toluene | 5.47 |
| 6 | Methyl amyl ketone | 166.67 |

Components 1 and 2 were charged to a flask fitted with a stirrer, nitrogen inlet, thermocouple and toluene filled Dean and Stark condenser. The mixture was raised to reflux, held for 15 minutes and then cooled to 80° C. Components 3, 4 and 5 were added and the temperature was increased to 125° C. and maintained for eight hours, solvent being drained from the Dean and Stark condenser if reflux occurred at a lower temperature. Component 6 was then added. The reaction product had a solids content of 82.1% and a number average molecular weight of 2550.

Example 5

Two coating compositions for comparative purposes ("C1" and "C2") and one coating of the present invention ("present coating") were prepared using the ingredients and amounts (in grams) shown in Table 1. The samples were prepared as follows. All ingredients except isocyanate were weighed together in a 2 oz jar and shaken for 10 minutes to combine. The isocyanate was added and hand stirred until homogenous. The formulated paint was then applied to a cold rolled steel panel for property testing, and to aluminum panels for biodegradability and humidity testing. The application method was a draw down with a #58 wirewound coil bar. The panels were flashed at ambient temperature for 10 minutes and then baked for 30 minutes at 180° F.

Panels were not tested until the next day. The final films were 2.2 mils to 2.7 mils in thickness. Table 1 also lists the results of hardness testing, humidity testing and the compost exposure results.

TABLE 1

| Material | C1 Coating | C2 Coating | Present Coating |
|---|---|---|---|
| TSAX 13-722 Acrylic[4] | 14.71 | — | — |
| BiOH 1560 | — | 8.33 | — |
| Resin of example 1 | — | — | 11.07 |
| 10% DBTDL[5] | 0.3 | 0.3 | 0.3 |
| Methyl ethyl ketone | 0.37 | 3.99 | 4.16 |
| DESMODUR N 3390A BA/SN[6] | 4.63 | 7.39 | 4.47 |
| Testing | | | |
| Pencil Hardness (ASTM D3363) | H | 2B | HB |
| Humidity Resistance (ASTM D1735) 1000 hrs[7] | Minor haze, no blisters | Haze, microblisters | No haze, scattered microblisters |
| Compost Results (6 weeks)[8] | Heavy yellow staining, no gloss loss | Heavy yellow staining, no gloss loss | Slight staining, severe whitening (recovers overnight). Some roughening and film loss. |
| Compost Results (13 weeks)[8] | Heavy yellow staining, no gloss loss | Heavy yellow staining, no gloss loss | Slight staining, severe whitening (recovers overnight). Severe pitting. Softer. Film totally removed from some areas. |
| Poly(lactic acid) content[9] | 0 | 0 | 39.7% |

[4]Petroleum-based acrylic polyol, available from Nuplex Resins, LLC.
[5]Dibutyl tin dilaurate solution (10% by weight in methyl amyl ketone).
[6]Polymeric hexamethylene diisocyanate, 90% by weight in organic solvent, available from Bayer Material Science, LLC.
[7]Blisters rated according to ASTM D714. Panels were not scribed.
[8]Test panels were placed coated side up in a domestic compost bin, to which roughly equal volumes of vegetable scraps and dry leaves were added regularly together with enough water to keep the contents moist but not soggy. After the allotted time, the panels were removed, washed and assessed for changes against unexposed panels.
[9]Theoretical percentage by weight of poly(lactic acid) segments in cured coating.

Coating compositions C1 and C2 containing the acrylic copolymer and the soy polyol show no evidence of biodegradability. The present coating composition (containing the lactide modified soy polyol) has similar hardness and humidity resistance to the acrylic standard, but shows evidence of biodegradation after composting.

Examples 6-8

Biodegradable coating compositions were prepared and applied to steel panels as described above using the components listed in Table 2.

TABLE 2

| Material | Example 6 | Example 7 | Example 8 |
|---|---|---|---|
| Resin of example 2 | 47.24 | 24.10 | 23.65 |
| Resin of example 4 | — | 15.73 | — |
| Resin of example 3 | — | — | 16.62 |
| 10% DBTDL | 0.72 | 0.72 | 0.72 |
| Methyl ethyl ketone | 0.26 | 9.01 | 7.27 |
| DESMODUR N 3390A BA/SN | 11.79 | 11.22 | 11.75 |
| Testing | | | |
| Pencil Hardness (ASTM D3363) | H | H | H |
| Reverse Impact resistance (ASTM 2794) | 70 cm/kg | 130 cm/kg | 120 cm/kg |
| Poly (lactic acid content) | 22.0% | 30.7% | 43.8% |

The examples illustrate the preparation of coatings containing different levels of poly(lactic acid) segments. All coatings have acceptable hardness and impact resistance.

Whereas particular embodiments of this invention have been described above for purposes of illustration, it will be evident to those skilled in the art that numerous variations of the details of the present invention may be made without departing from the invention as defined in the appended claims.

Therefore we claim:
1. A crosslinked coating comprising:
   a) the reaction product of
      i) a compound containing two or more active hydrogen groups; and
      ii) a lactide; and b) a crosslinker, wherein the reaction product has a hydroxyl value of 40 to 350.

2. The coating of claim 1, wherein the compound containing two or more active hydrogen groups comprises polyol.

3. The coating of claim 2, wherein the polyol comprises soy polyol.

4. The coating of claim 1, wherein the coating comprises $\geq 20$ weight % poly (lactic acid) units, wherein weight % is based on the total solid weight of the coating.

5. The coating of claim 4, wherein the coating comprises $\geq 32$ weight % poly (lactic acid) units, wherein weight % is based on the total solid weight of the coating.

6. The coating of claim 5, wherein the coating comprises $\geq 38$ weight % poly (lactic acid) units, wherein weight % is based on the total solid weight of the coating.

7. The coating of claim 1, wherein the crosslinker comprises a polyisocyanate, a blocked polyisocyanate and/or a melamine formaldehyde.

8. The coating of claim 1, wherein the coating is a multi-component coating and a) is in a first component and b) is in a second component.

9. The coating of claim 1, wherein the coating is a one component coating.

10. The coating of claim 1, wherein the reaction product has a hydroxyl value of 80 to 220.

11. The coating of claim 1, wherein the reaction product has an Mn of 750 to 10,000.

12. A substrate coated at least in part with the coating of claim 1.

13. The substrate of claim 12, wherein the substrate is metallic.

14. The substrate of claim 12, wherein the substrate is non-metallic.

15. The substrate of claim 12, wherein the substrate is polymeric.

16. The substrate of claim 12, wherein the substrate is nylon.

17. The substrate of claim 12, wherein the substrate is PC/ABS.

18. The substrate of claim 12, wherein the substrate is biodegradable.

19. The coating of claim 1, wherein the ratio by weight in the reaction product of a compound containing two or more active hydrogen groups to lactide is 1:>10 to 1:10,000.

20. The coating of claim 19, wherein the ratio is 1:50 to 1:4000.

21. A substrate coated at least in part with the coating of claim 19.

22. The substrate of claim 21, wherein the substrate is biodegradable.

23. A coating comprising the reaction product of:
 i) a compound containing two or more active hydrogen groups; and
 ii) a lactide; wherein the ratio by weight of i) to ii) is 1:>10 to 1:10,000 and the reaction product has a hydroxyl value of 40 to 350.

24. The coating of claim 23, wherein the ratio of i) to ii) is 1:50 to 1:400.

25. The coating of claim 23, further comprising an additional film-forming resin comprising an acrylic copolymer.

26. A substrate coated at least in part with the coating of claim 23.

27. The substrate of claim 26, wherein said coating is a basecoat.

* * * * *